US012115124B2

(12) United States Patent
Wang et al.

(10) Patent No.: US 12,115,124 B2
(45) Date of Patent: Oct. 15, 2024

(54) BUBBLE BATH PHYSIOTHERAPY SYSTEM AND BATHTUB DEVICE THEREOF

(71) Applicant: Letsozone Enterprise Development Co., Ltd, Shanghai (CN)

(72) Inventors: Bill Wang, Shanghai (CN); Michael Zhang, Shanghai (CN)

(73) Assignee: Letsozone Enterprise Development Co., Ltd, Shanghai (CN)

( * ) Notice: Subject to any disclaimer, the term of this patent is extended or adjusted under 35 U.S.C. 154(b) by 371 days.

(21) Appl. No.: 17/623,838

(22) PCT Filed: Jun. 24, 2020

(86) PCT No.: PCT/CN2020/097905
§ 371 (c)(1),
(2) Date: Dec. 29, 2021

(87) PCT Pub. No.: WO2021/000765
PCT Pub. Date: Jul. 1, 2021

(65) Prior Publication Data

US 2022/0249321 A1 Aug. 11, 2022

(30) Foreign Application Priority Data

Jul. 1, 2019 (CN) ........................ 201910585455.7

(51) Int. Cl.
*A61H 33/02* (2006.01)
*A61H 33/00* (2006.01)

(52) U.S. Cl.
CPC ....... *A61H 33/028* (2013.01); *A61H 33/6005* (2013.01)

(58) Field of Classification Search
CPC .. A61H 33/028; A61H 33/6005; A47K 3/001; A47K 3/02
See application file for complete search history.

(56) References Cited

U.S. PATENT DOCUMENTS 6,317,903 B1 * 11/2001 Brunelle ................ A61H 33/60
4/541.3
2004/0107492 A1 6/2004 Cunerty
(Continued)

FOREIGN PATENT DOCUMENTS

CN 105598119 A 5/2016
CN 206252432 U 6/2017
(Continued)

OTHER PUBLICATIONS

PCT International Search Report and Written Opinion of the International Search Authority issued in International Application No. PCT/CN2020/097905, Sep. 29, 2020, 6 pp.
(Continued)

*Primary Examiner* — Christine J Skubinna
(74) *Attorney, Agent, or Firm* — Fitch, Even, Tabin & Flannery LLP

(57) ABSTRACT

A bathtub device for bubble bath physiotherapy, wherein the bathtub body is mounted on the bathtub body support. The exhaust system of the bathtub device is mounted in a space between the bathtub body and the bathtub body support. A fan is configured for delivering gas. The air suction inlet ends of the air suction pipe are configured to be in communication with the upper open side of the bathtub body, and the air suction outlet end is connected to the air inlet side interface device of the fan. The exhaust inlet end of the exhaust pipe is connected to the air outlet side interface device of the fan. The present invention further provides a bubble bath physiotherapy system comprising the bathtub device. By using the bathtub device, a safer bubble bath can be achieved.

10 Claims, 9 Drawing Sheets

(56) References Cited

U.S. PATENT DOCUMENTS

| | | | | |
|---|---|---|---|---|
| 2010/0223721 A1* | 9/2010 | May | A61H 33/02 | |
| | | | 4/541.1 | |
| 2020/0197259 A1* | 6/2020 | Estrada | A47C 1/11 | |

FOREIGN PATENT DOCUMENTS

| | | | | |
|---|---|---|---|---|
| CN | 207561845 | U | * | 7/2018 |
| CN | 109908697 | A | | 6/2019 |
| CN | 110367855 | A | | 10/2019 |
| JP | S6129738 | U | | 2/1986 |
| JP | S63117552 | U | | 7/1988 |
| JP | H0565288 | U | | 3/1993 |

OTHER PUBLICATIONS

PCT International Search Report and Written Opinion of the International Search Authority issued in International Application No. PCT/CN2020/097905, Sep. 29, 2020, 5 pp.

Japanese Office Action, Japanese Patent Application No. 2021-578019, dated Feb. 2, 2023, 4 pages (with English translation).

* cited by examiner

BUBBLE BATH PHYSIOTHERAPY SYSTEM AND BATHTUB DEVICE THEREOF

TECHNICAL FIELD

The present invention relates to a bubble bath physiotherapy system, and in particular, to a bathtub device for bubble bath physiotherapy.

BACKGROUND ART

Nowadays, various gases, such as hydrogen or ozone, are injected into water to generate bubbles so as to use the water with the gases dissolved therein for bubble bath physiotherapy of some people. The water with the foregoing dissolved gases may have the effects of health care and relaxation. Generally, water with dissolved hydrogen may be also referred to as hydrogen-rich water or hydrogen water, water with dissolved ozone may be referred to as ozone water, and water with dissolved negative oxygen ion gas is referred to as negative ion water.

Taking negative ion water as an example, the inventors realized that water with dissolved negative ion gas is beneficial to human body, but ozone gas produced by the water together with the negative ion gas may overflow from the water, causing a user to inhale excessive ozone gas, which is harmful to health.

Therefore, it is desirable to design a bathtub device for bubble bath physiotherapy, which may remove the overflow of gas during the bubble bath physiotherapy or from an mixture of gas and liquid, such that the gas to be inhaled by a human body can fall to a safe level.

SUMMARY OF THE INVENTION

An object of the present invention is to provide a bathtub device for bubble bath physiotherapy, which achieves a safer bubble bath.

The present invention provides a bathtub device for bubble bath physiotherapy, comprising a bathtub body and a bathtub body support, wherein the bathtub body has an enclosing side wall, a bottom wall, and an upper open side, and the bathtub body is mounted on the bathtub body support. The bathtub device further comprises an exhaust system, wherein the exhaust system is mounted in a space between the bathtub body and the bathtub body support. A fan is configured for delivering gas and has an air inlet side interface device and an air outlet side interface device. An air suction pipe has air suction inlet ends and an air suction outlet end, wherein the air suction inlet ends are configured to be in communication with the upper open side of the bathtub body, such that the air suction inlet ends are capable of sucking the gas discharged from the bathtub body, and the air suction outlet end is connected to the air inlet side interface device of the fan. An exhaust pipe has an exhaust inlet end and an exhaust outlet end, and the exhaust inlet end is connected to the air outlet side interface device of the fan.

In an embodiment, the air suction pipe comprises at least two air suction inlet ends, wherein at least one of the air suction inlet ends is in communication with the upper open side at a tail of the bathtub body, and the other air suction inlet ends are in communication with the upper open side at a head of the bathtub body.

In an embodiment, the air suction pipe is divided into a tail air suction pipe and a head air suction pipe, wherein the air suction inlet end of the tail air suction pipe is arranged at the tail of the bathtub body and is in communication with the upper open side, the air suction inlet end of the head air suction pipe is in communication with the upper open side at the head of the bathtub body, and air suction outlet ends of the two air suction pipes are connected to the air inlet side interface device.

In an embodiment, the air suction inlet end is an air suction hole in an upper side of the enclosing side wall of the bathtub body.

In an embodiment, the air suction hole comprises an outer hole connecting member and an inner hole connecting member, the bathtub body is provided with a mounting hole corresponding to the inner hole connecting member, the mounting hole is higher than an overflow hole of the bathtub body, the inner hole connecting member and the outer hole connecting member each have flange edges, the inner hole connecting member passes through the mounting hole and is inserted in and connected to the outer hole connecting member located on an outer side of the bathtub body, the flange edges of the inner hole connecting member and the outer hole connecting member are respectively located on an inner side and an outer side of the enclosing side wall of the bathtub body and clamp the bathtub body, the air suction pipe comprises a main pipe and a plurality of tubes on one side of the air suction inlet end, the outer hole connecting member is provided with tube holes corresponding to the plurality of tubes, and the plurality of tubes connect the main pipe to the air suction hole to form a flow path for delivering the gas.

In an embodiment, the air suction pipe is provided with a water storage portion adjacent to the air suction inlet end, the water storage portion is provided with a drainage device that allows the fan to suck the gas from the upper open side of the bathtub body through the air suction pipe and that further allows the water in the water storage portion to be discharged from the water storage portion.

In an embodiment, the drainage device is a small opening, and the small opening is sized in such a way that the air suction volume of the fan is not substantially affected; or the drainage device is a drain valve, the bathtub device further comprises an anti-overflow sensor arranged on the water storage portion and configured to detect liquid downstream of the air suction inlet end, and the drain valve drains water based on an output signal of the anti-overflow sensor.

In an embodiment, the air suction inlet end is independent of the bathtub body, and has an air suction direction configured to be adjustable.

In an embodiment, the bathtub body has a length direction and two ends located in the length direction, an auxiliary device adjacent to the upper open side is provided at one of the two ends of the bathtub body, a mounting space is provided below the auxiliary device, and the fan is arranged in the mounting space; the air suction pipe is divided into a short air suction pipe and a long air suction pipe, and the short air suction pipe is led out from the air inlet side interface device of the fan and extends in the height direction of the bathtub body; and the long air suction pipe is led out from the air inlet side interface device of the fan, extends in the length direction of the bathtub body to the other one of the two ends, and then extends in the height direction of the bathtub body.

In an embodiment, a flow control valve capable of being manually or electronically controlled is provided in the air suction pipe and is configured to control the diameter of the air suction pipe so as to adjust the air suction volume at the air suction inlet end.

In an embodiment, the bathtub device further comprises a fan controller and a gas sensor, wherein the gas sensor is arranged corresponding to the upper open side of the bathtub body and is configured to detect the concentration of a specific gas at the upper open side of the bathtub body, and the fan controller controls the rotational speed of the fan based on an output signal of the gas sensor.

In an embodiment, the bathtub body comprises a head and a tail, the bathtub body support comprises a hinge device arranged corresponding to an upper side of the tail of the bathtub and further comprises a rail device connected to the hinge device, the rail device comprises a rail extending from the tail to the head on the upper side of the bathtub body, the bathtub device further comprises a cover plate provided with a slide rail, the slide rail is in sliding fit with the rail, such that the cover plate is capable of being guided by the rail to slide, and the rail device and the cover plate are capable of being supported by the hinge device to rotate.

In an embodiment, the bathtub body comprises a head and a tail, the bathtub body support comprises a hinge device arranged corresponding to an upper side of the tail of the bathtub, the bathtub device further comprises a cover plate that is divided into a front cover plate section and a rear cover plate section in a direction from the head to the tail, the rear cover plate section is connected to the hinge device, and the front cover plate section is arranged above the rear cover plate section and is capable of sliding relative to the rear cover plate section; and the cover plate is capable of being supported by the hinge device to rotate.

The present invention further provides a bubble bath physiotherapy system, comprising a gas generator and a bathtub device, the gas generator delivering a physiotherapy gas to the bathtub device, wherein the bathtub device is the bathtub device mentioned above, and the exhaust air volume of the exhaust system is set to be greater than or equal to the quantity of gas escaping per minute from 1 L of water multiplied by the volume of the bathtub body.

By means of the bathtub device and the bubble bath physiotherapy system mentioned above, harmful gases can be timely removed during bubble bath physiotherapy of a user, thereby achieving a safe bubble bath. The exhaust system is arranged to make full use of the configuration of the bathtub device, which saves on space and is easy to mount. The user's usage habits are fully taken into consideration in the design of the cover plate, which facilitates an operation for the user and improves the user's comfort.

BRIEF DESCRIPTION OF THE DRAWINGS

The foregoing and other features, properties and advantages of the present invention will become more apparent from the following description made with reference to embodiments and drawings, in which.

PARTICULAR EMBODIMENTS OF THE INVENTION

Figure 1:
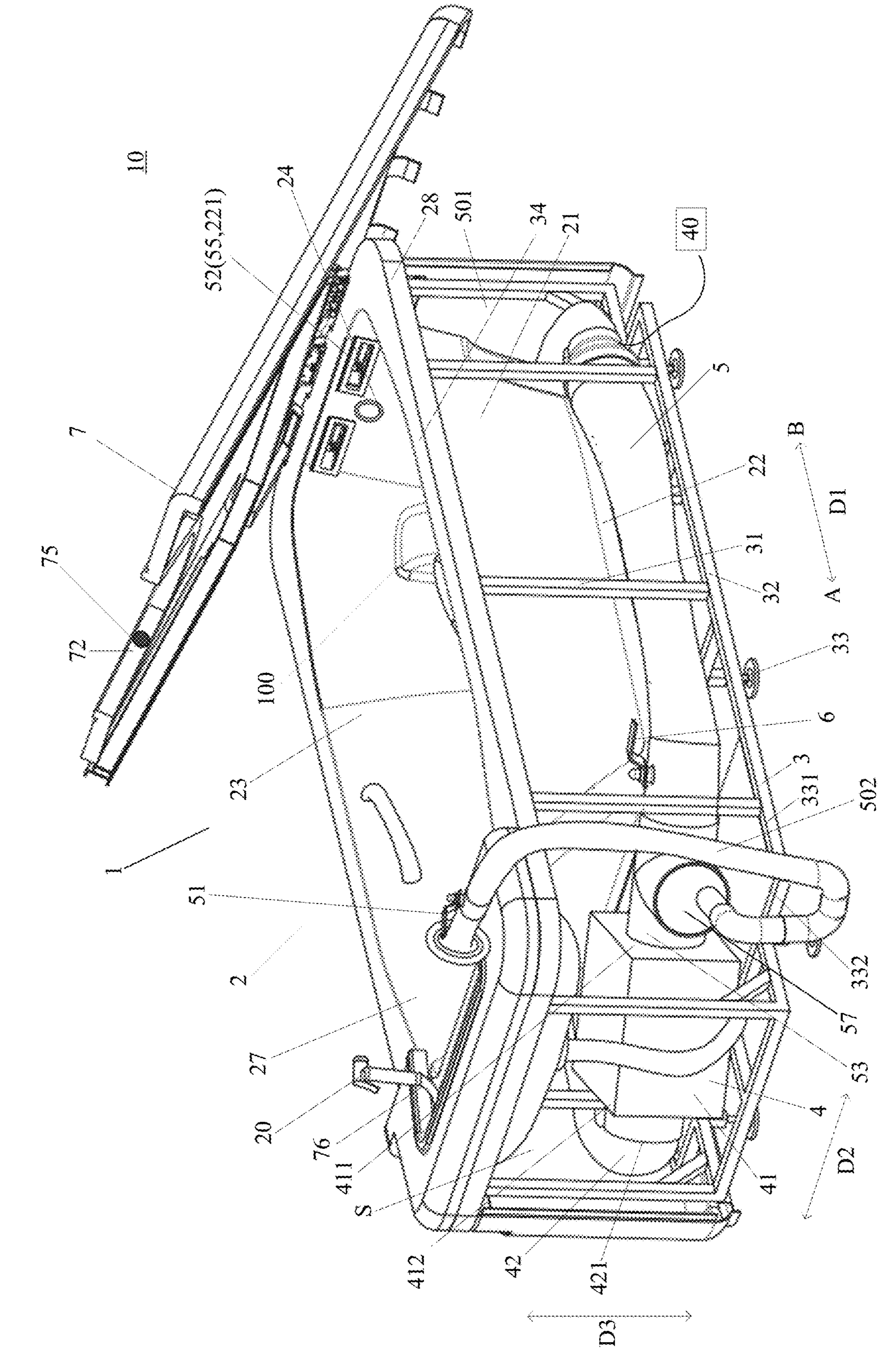
FIG. 1 is a perspective view of an example bathtub device.

The present invention will be further described below with reference to specific embodiments and the drawings, and more details are explained in the following description for the ease of fully understanding the present invention; however, the present invention can obviously be implemented in various different manners than those described herein, a person skilled in the art can make a similar extension and deduction without departing from the connotation of the present invention according to practical applications, and therefore the scope of protection of the present invention should not be limited to the content of the specific embodiments.

For example, a first feature recorded later in the specification being formed above or over a second feature may include an embodiment in which the first feature and the second feature are formed via a direct contact, or may include an embodiment in which an additional feature is formed between the first feature and the second feature such that the first feature and the second feature may not be in direct contact. Additionally, reference numerals and/or letters may be repeated in different examples in the disclosure. This repetition is for the sake of brevity and clarity, and does not itself represent the relationship between the various embodiments and/or structures to be discussed. Further, when a first element is described in connection with or in combination with a second element, the description includes an embodiment in which the first and second elements are directly connected or combined to each other, and also includes the use of one or more other intervening elements such that the first and second elements are indirectly connected or combined to each other.

As shown in the present invention, unless the context clearly indicates an exception, the words "a", "an" and/or "the" do not specifically refer to the singular, but may also include the plural. Generally speaking, the terms "including" and "comprising" only imply the inclusion of clearly identified steps and elements, these steps and elements do not constitute an exclusive list, and the method or device may also include other steps or elements.

For ease of description, spatial relation words such as "under", "below", "lower", "beneath", "above", and "over" may be used herein to describe a relationship between an element or feature shown in the drawings and another element or feature. It shall be understood that these spatial relation words are intended to include other orientations of the devices in use or operation besides the directions described in the drawings. For example, if the devices in the drawings are flipped, the orientation of the element described as being "below" or "under" or "beneath" another element or feature will be changed to being "above" the another element or feature. Therefore, the example words "below" and "beneath" may include both directions: up and down. The device may also have other orientations (rotated by 90° or in another direction), and thereby spatial relationship descriptors used herein should be explained accordingly. In addition, it shall be further understood that when a layer is referred to as being "between" two layers, the layer may be the only layer between the two layers, or there may be one or more layers therebetween.

It should be noted that these and other subsequent drawings are merely used as examples, and are not necessarily drawn to scale, and should not be used as a limitation to the actually claimed scope of protection of the present invention. In addition, variants under different embodiments may be appropriately combined.

Figure 2:
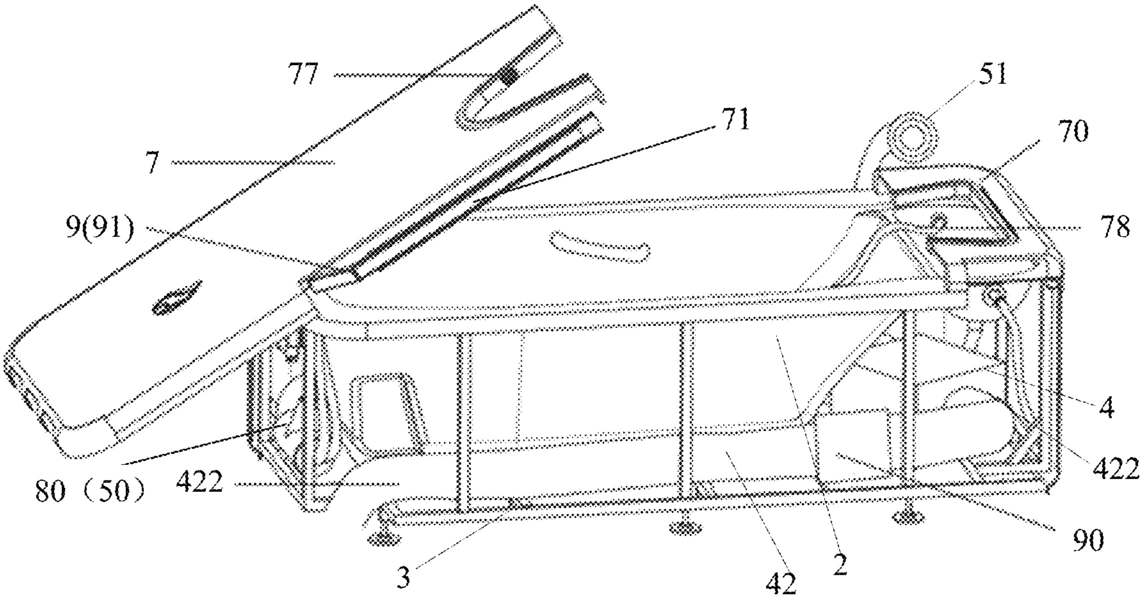
FIG. 2 is another perspective view of the example bathtub device.

FIGS. 1 and 2 show a bathtub device 1 for bubble bath physiotherapy from different perspectives. The bathtub device 1 may comprise a bubble bath physiotherapy system 10. The bubble bath physiotherapy system 10 further comprises a gas generator 40, and the gas generator 40 may deliver a physiotherapy gas, such as ozone or hydrogen, to the bathtub device 1.

The bathtub device 1 comprises a bathtub body 2. The bathtub body 2 has an enclosing side wall 21, a bottom wall 22, and an upper open side 23. For ease of description, the bathtub device 1 or the bathtub body 2 comprises a length direction D1, a width direction D2, and a height direction D3. The length direction D1 may refer to a front-rear direction when a user usually sits or lies in the bathtub device 1, the width direction D2 refers to a left-right direction when the user usually sits or lies in the bathtub device 1, and the height direction D3 is a vertical direction.

The bathtub device 1 comprises a bathtub body support 3. The bathtub body 2 is mounted on the bathtub body support 3. In the illustrated embodiment, the bathtub body support 3 is of a frame structure substantially composed of a plurality of columns 31 and a plurality of cross beams 32, wherein the plurality of cross beams 32 comprise a plurality of longitudinal beams 331 extending in the length direction D1 and a plurality of transverse beams 332 extending in the width direction D2. The plurality of columns 31 are arranged around the enclosing side wall 21 of the bathtub body 2, and the plurality of cross beams 32 are generally located on a lower side of the bottom wall 22 of the bathtub body 2. In other words, the plurality of columns 31 and the plurality of cross beams 32 of the bathtub body support 3 surround the bathtub body 2 from the lower side. The bathtub body support 3 further comprises legs 33 that connect the cross beams 32 and may support the entire bathtub device 1. The legs 33, for example, may be configured to be adjustable in height, or be provided with a roller to facilitate mounting or movement. The bathtub body support 3 may further comprise a peripheral edge 34 of the bathtub body 2. The peripheral edge 34 is located on an upper side of the enclosing side wall 21, that is, the peripheral edge 34 may be regarded as a part of the bathtub body 2, or as a part of the bathtub body support 3.

The bathtub device 1 further comprises an exhaust system 4. The exhaust system 4 is mounted in a space between the bathtub body 2 and the bathtub body support 3.

For example, in the bubble bath physiotherapy system, an exhaust air volume of the exhaust system 4 may be set to be greater than or equal to a delivery volume of the gas generator to the bathtub device 1, and the delivery volume of the gas generator may be detected by a sensor or a flow meter, or may be known by presetting. That is, the delivery volume of the gas generator may vary in real time or be at a constant value. Accordingly, the exhaust air volume of the exhaust system 4 may be at a preset constant value, or the bathtub device 1 may comprise a fan controller, and the exhaust air volume of the exhaust system 4 can be controlled by the fan controller to vary in real time.

The exhaust air volume of the exhaust system 4 may be also set by means of calculation according to the quantity of escaped gas and a volume of the bathtub body 2. For example, the exhaust air volume of the exhaust system 4 is set as follows: exhaust air volume (L/min)≥the quantity (L) of gas escaping per minute from 1 L of water multiplied by the volume (L) of the bathtub body, wherein the volume (L) of the bathtub body may be known in advance, and the quantity (L) of the gas escaping per minute from 1 L of water can be estimated according to the delivery volume of the gas generator. In view that the delivery volume of the gas generator may vary in real time or be at a constant value, the quantity (L) of the gas escaping per minute from 1 L of water may vary in real time or be at a constant value accordingly. Therefore, the exhaust air volume of the exhaust system 4 may be also controlled to vary in real time, or may be a preset constant value accordingly. Alternatively, the bathtub device 1 comprises a fan controller and a gas sensor. For example, the gas sensor may be arranged corresponding to the upper open side 23 of the bathtub body 2 to be described below and can detect the concentration of a specific gas at the upper open side 23 of the bathtub body 2, such as ozone or hydrogen. The fan controller may control the exhaust air volume of the exhaust system 4 based on an output signal of the gas sensor, such as controlling the rotational speed or power of a fan 41 to be described below.

The example configuration of the exhaust system 4 is further particularly shown in FIG. 3A, and the exhaust system 4 will be described below with reference to FIGS. 1, 2, and 3A.

The exhaust system 4 comprises the fan 41, and the fan 41 may deliver a gas. The fan 41 is provided with an air inlet side interface device 411 and an air outlet side interface device 412. For example, the fan 41 may be a quiet air conditioner, so as to implement quiet exhaust without affecting the comfort of a user of a bubble bath for at a close range.

In the illustrated embodiment, the bathtub body 2 has two ends A and B in the length direction D1, an auxiliary device 20 adjacent to the upper open side 23 is provided at the end A of the two ends A and B of the bathtub body 2, a mounting space S is provided below the auxiliary device 20, and the fan 41 is arranged in the mounting space S. For example, the auxiliary device 20 may be a shampoo basin for washing hair as shown in FIG. 1, and the shampoo basin may be formed integrally with the bathtub body 2. In this way, the structure of the bathtub device 1 can be fully used to save on space. A side edge of the shampoo basin as the auxiliary device 20 close to the upper open side 23 may alternatively be designed as a headrest portion for the user sitting or lying in the bathtub device 1. At this point, one end A (hereinafter referred to as a front end A) where the auxiliary device 20 is arranged may be referred to as a head 27 of the bathtub body 2, that is, the side where the head of the user is located when the user usually sits or lies in the bathtub device 1, and the other end B (hereinafter referred to as a rear end B) may be referred to as a tail 28 of the bathtub body 2, that is, the side where the feet of the user are located when the user usually sits or lies in the bathtub device 1.

The exhaust system 4 further comprises an air suction pipe 5. The air suction pipe 5 has air suction inlet ends 51 and 52 and an air suction outlet end 53. The air suction inlet ends 51 and 52 are configured to be in communication with the upper open side 23 of the bathtub body 2, such that the air suction inlet ends 51 and 52 are capable of sucking the gas discharged from the bathtub body 2, and the air suction outlet end 53 is connected to the air inlet side interface device 411 of the fan 41.

The exhaust system 4 further comprises an exhaust pipe 42. Referring to FIGS. 2 and 3A, the exhaust pipe 42 has an exhaust inlet end 421 and an exhaust outlet end 422, wherein the exhaust inlet end 421 is connected to the air outlet side interface device 412 of the fan 41. In the figures, the exhaust outlet end 422 of the exhaust pipe 42 has an opening facing down, and for example, can communicate with a ventilation system for a bathroom in which the bathtub device 1 is placed, so as to discharge the gas to the outside of the bathroom.

Figure 3A:
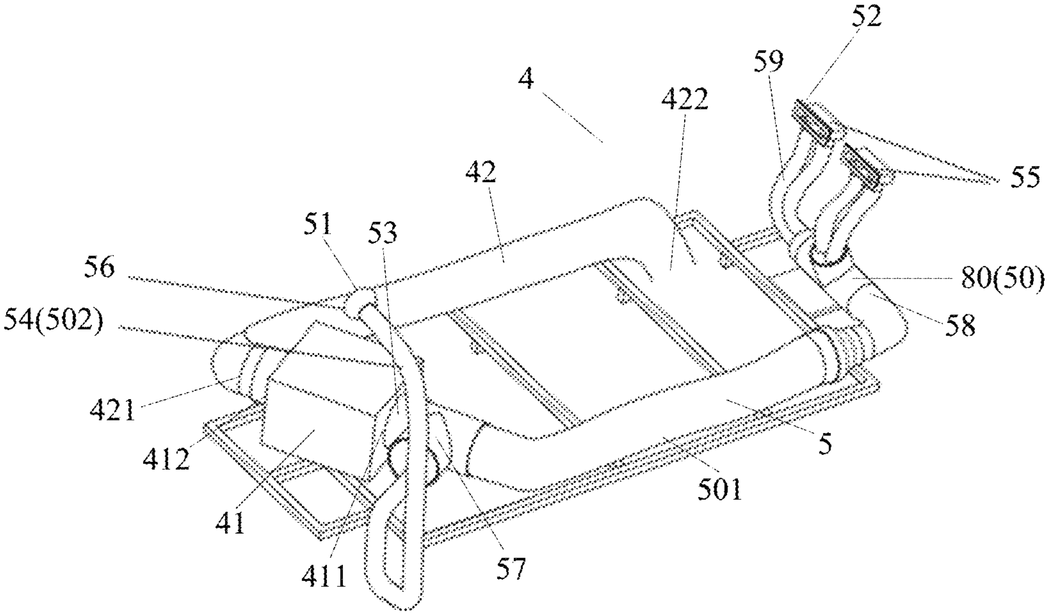
FIG. 3A is a perspective view of an example exhaust system.

With reference to FIGS. 1 and 3A, the air suction pipe 5 comprises at least two air suction inlet ends 51 and 52, wherein at least one of the air suction inlet ends, that is, the air suction inlet end 52, is in communication with the upper open side 23 at the tail 28 of the bathtub body 2, that is, at the rear end B, and the other air suction inlet ends, that is, the air suction inlet end 51, are in communication with the upper open side 23 at the head 27 of the bathtub body 2, that is, at the front end A. In FIG. 1, the air suction inlet end 51 faces the shampoo basin used as the auxiliary device 20. In FIG. 3A, the air suction inlet end 52 comprises two air suction inlet ends that are arranged separately. In another embodiment, the air suction inlet end 52 may comprise only one air suction inlet end or three or more air suction inlet ends that are arranged separately. The air suction inlet end 51 comprise only one air suction inlet end. In another embodiment, similar to the air suction inlet end 52, the air suction inlet end 51 may also comprise two or more air suction inlet ends that are arranged separately. A three-way connector 57 may be mounted on the air suction pipe 5. In FIG. 1, at a position close to the air suction outlet end 53, one port of the three-way connector 57 is in communication with the air suction outlet end 53, another port of the three-way connector 57 is in communication with the air suction inlet end 51, and the other port of the three-way connector 57 is in communication with the air suction inlet end 52.

In another embodiment, the air suction pipe 5 may be divided into two air suction pipes, i.e., a tail air suction pipe and a head air suction pipe, wherein the air suction inlet end of the tail air suction pipe is arranged at the tail 28 of the bathtub body 2, that is, at the rear end B, and is in communication with the upper open side 23, the air suction inlet end of the head air suction pipe is in communication with the upper open side 23 at the head 27 of the bathtub body 2, that is, at the front end A, and air suction outlet ends of the two air suction pipes, i.e., the tail air suction pipe and the head air suction pipe, are each connected to the air inlet side interface device 411 of the fan 41.

In FIG. 1, the air suction inlet end 52 is an air suction hole 55 in the enclosing side wall 21.

Figure 3B:
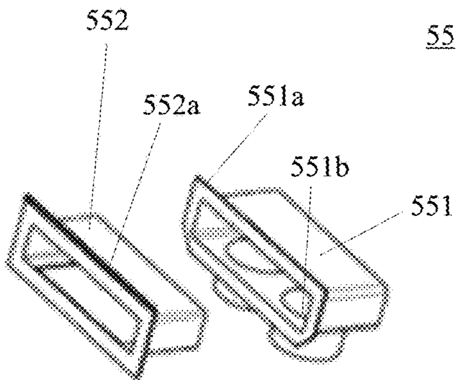
FIG. 3B is a structural view of an example air suction hole.

FIG. 3B shows an example configuration of an air suction hole 55. The air suction hole 55 comprises an outer hole connecting member 551 and an inner hole connecting member 552. In FIG. 1, the bathtub body 2 (particularly the enclosing side wall 21) has a mounting hole 221 corresponding to the inner hole connecting member 552, that is, the inner hole connecting member 552 is arranged in the mounting hole 221. The mounting hole 221 is higher than an overflow hole 24 of the bathtub body 2, so as to ensure that no water flows into the air suction hole 55 from the bathtub body 2 under normal circumstances.

Continuing referring to FIG. 3B, the inner hole connecting member 552 and the outer hole connecting member 551 each have flange edges 552*a* and 551*a*. The inner hole connecting member 552 passes through the mounting hole 221 of the bathtub body 2 and is inserted in and connected to the outer hole connecting member 551 located on an outer side of the bathtub body 2, and the flange edges 552*a* and 551*a* of the inner hole connecting member 552 and the outer hole connecting member 551 are respectively located on an inner side and an outer side of the enclosing side wall 21 of the bathtub body 2 and clamp the bathtub body 2, which facilitates fixation and has a good sealing performance. With reference to FIGS. 3A and 3B, the air suction pipe 5 comprises a main pipe 58 and a plurality of tubes 59 on one side of the air suction inlet end 52. The outer hole connecting member 551 is provided with tube holes 551*b* corresponding to the plurality of tubes 59, and the plurality of tubes 59 connect the main pipe 58 to the air suction hole 55 (particularly the tube holes 551*b*) to form a flow path for delivering the gas. In FIG. 3A, four tubes 59 are shown, and every two tubes 59 correspond to one air suction hole 55. Two tubes 59 corresponding to one air suction hole 55 may be referred to as a group of tubes 59. The main pipe 58 and the two groups of tubes 59 are connected by means of an exhaust tee 80, that is, one port of the exhaust tee 80 is in communication with the main pipe 58, and the other two ports are respectively in communication with the two groups of tubes 59.

In FIG. 1, the air suction inlet end 51 is independent of the bathtub body 2, and has an air suction direction configured to be adjustable. For example, a pipeline 54 connected to the air suction inlet end 51 is a pipe that may be oriented as desired, and is exposed outside the bathtub body 2, which may facilitate arbitrary adjustment of an air suction angle and direction when the user washes his/her hair. A flared suction hood 56 may be mounted at a port of the air suction inlet end 51 to enlarge an air suction area.

In another embodiment, the air suction inlet end 51 may be also arranged as an air suction hole in the enclosing side wall 21 similarly to the air suction inlet end 52, or the air suction inlet end 52 may be also arranged independently of the bathtub body 2 similarly to the air suction inlet end 51. Alternatively, in the case of presence of a cover plate described later, the air suction inlet ends 51 and 52 may be also provided in the cover plate to suck the gas in the bathtub body 1, and the air suction inlet ends 51 and 52 may be in communication with the fan 41 by using an elastic stretchable hose to adapt to open and close the cover plate.

The air suction pipe 5 may be further provided with a water storage portion 50 adjacent to the air suction inlet end 52. The water storage portion 50 may be specifically shaped in such a way that a space or a local lowest portion capable of storing water is formed by local bending of the air suction pipe 5. In the illustrated embodiment, the water storage portion 50 is a lower portion of the exhaust tee 80. The water storage portion 50 is provided with a drainage device (not shown in the figure) which allows the fan 4 to suck the gas from the upper open side 23 of the bathtub body 2 through the air suction pipe 5 and which further allows the water in the water storage portion 50 to be drained from the water storage portion. Therefore, this can prevent the water from accidentally entering the air suction pipe 5 through the air suction hole 55 and affecting the operation of the fan 41. The drainage device of the water storage portion 50 may be a small opening, and the small opening is sized in such a way that the air suction volume of the fan 4 is not substantially affected, that is, the water entering the water storage portion may be allowed to flow out without affecting the exhaust. Alternatively, the drainage device may be a drain valve. The bathtub device 1 may further comprise an anti-overflow sensor 302 (shown in FIG. 8). The anti-overflow sensor 302 may be arranged on the water storage portion 50 and is configured to detect liquid downstream of the air suction inlet end 52, and the drain valve of the drainage device may drain water based on an output signal of the anti-overflow sensor 302. For example, the anti-overflow sensor 302 may be a probe arranged at the lowest point of the water storage portion 50 or at the lowest point of the exhaust tee 80 or at a position on the enclosing side wall 21 of the bathtub body 2 slightly lower than the air suction hole 55. A liquid level alarm 301 (shown in FIG. 8) may be further provided to cooperate with the anti-overflow sensor 302. If the liquid level is higher than a touch point of the anti-overflow sensor 302, the liquid level alarm 301 is triggered to give an alarm.

Turning back to FIG. 1, the air suction pipe 5 may be divided into a short air suction pipe 502 and a long air suction pipe 501, and the short air suction pipe 502 is led out from the air inlet side interface device 411 of the fan 41 and extends substantially in the height direction D3 of the bathtub body 2. The long air suction pipe 501 may be led out from the air inlet side interface device 411 of the fan 41, extend substantially in the length direction D1 of the bathtub body 2 to the other of the two ends A and B, that is, to the rear end B in the figure, and then extend in the height direction D3 of the bathtub body 2.

Referring to FIG. 1, a flow control valve 6 capable of being manually or electronically controlled is provided in the air suction pipe 5, and is configured to control the diameter of the air suction pipe 5 so as to adjust the air suction volume at the air suction inlet end 52. The diameter of the air suction pipe 5 is also the size of an orifice that allows the gas to pass through. Controlling the flow control valve 6 may help adjust the exhaust air volume of the exhaust system 4 mentioned above. In the case of provision of the flow control valve 6, the exhaust air volume of the exhaust system 4 is not only related to the rotational speed or power of the fan 41, but also closely related to the adjustment of the flow control valve 6, and the foregoing fan controller may control the rotational speed or power of the fan 41, and may further control the opening of the flow control valve 6. In the illustrated embodiment, the flow control valve 6 is arranged between the air suction inlet end 52 and the three-way connector 57. In another embodiment, the flow control valve 6 may be arranged between the air suction inlet end 51 and the three-way connector 57, or the flow control valve 6 may be arranged between the air inlet side interface device 411 and the three-way connector 57.

Figure 4:
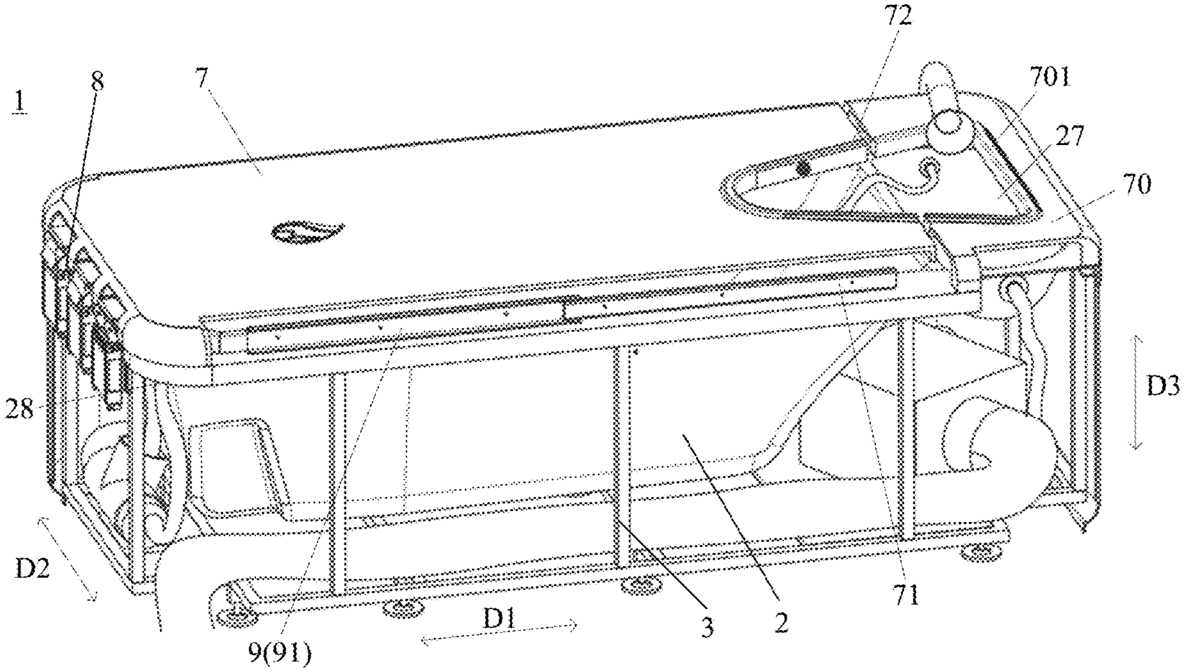
FIG. 4 is a perspective view of the bathtub device with a cover plate in a closed state.
Figure 5:
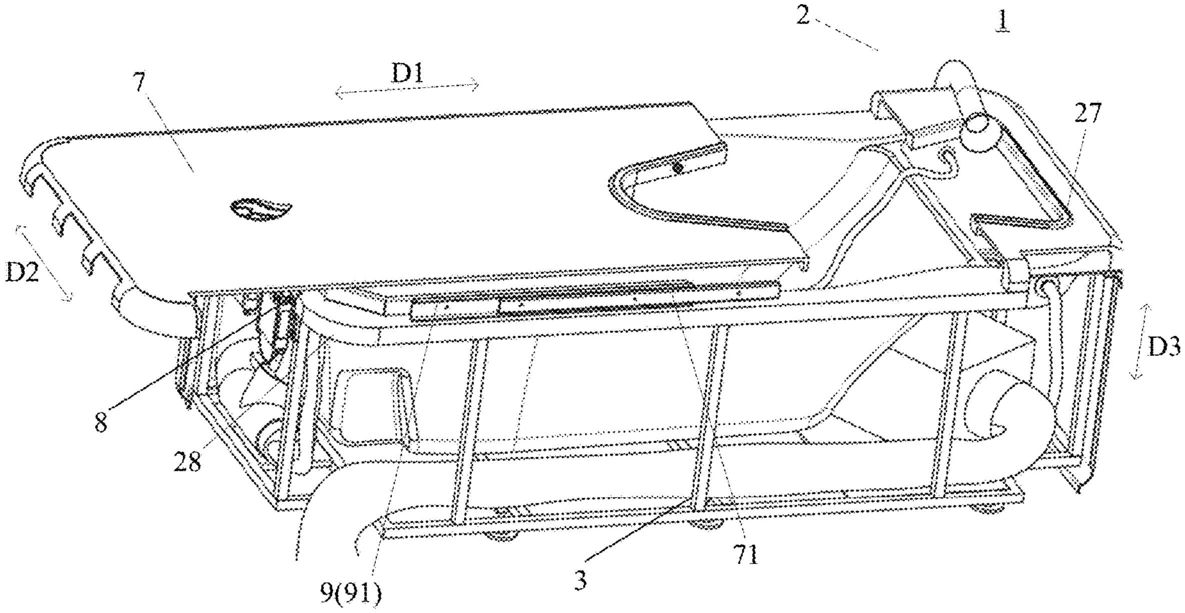
FIG. 5 is a perspective view of the bathtub device with the cover plate opened by sliding.
Figure 6:
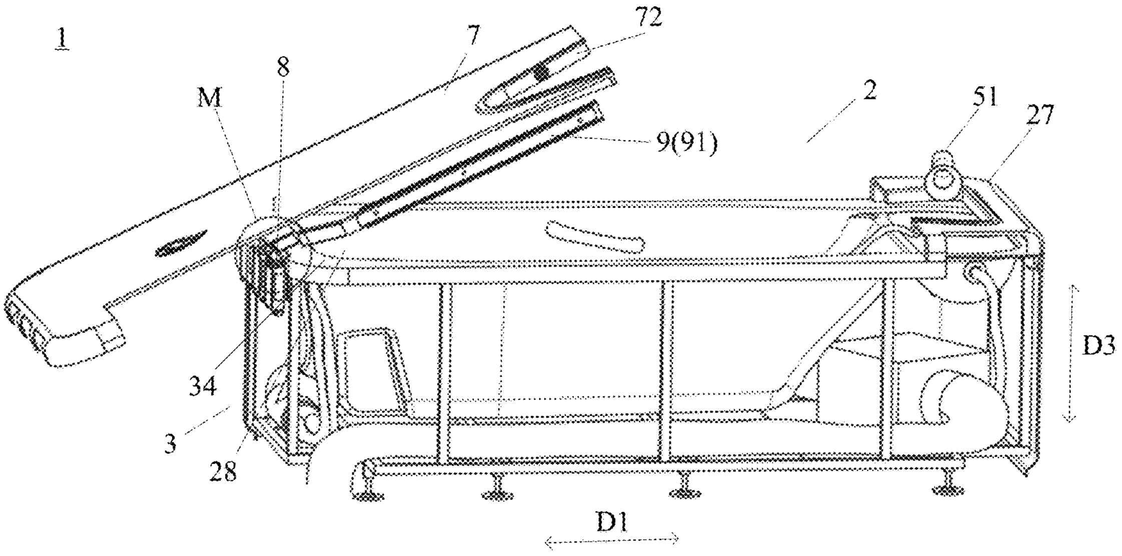
FIG. 6 is a perspective view of the bathtub device with the cover plate opened by rotating.
Figure 7:
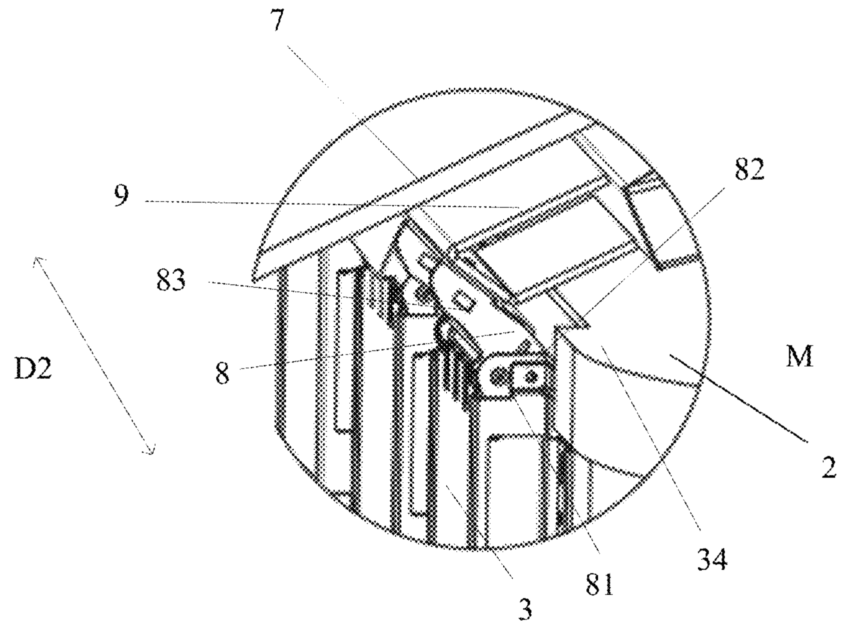
FIG. 7 is a partial enlarged view of a hinge device.
Figure 8:
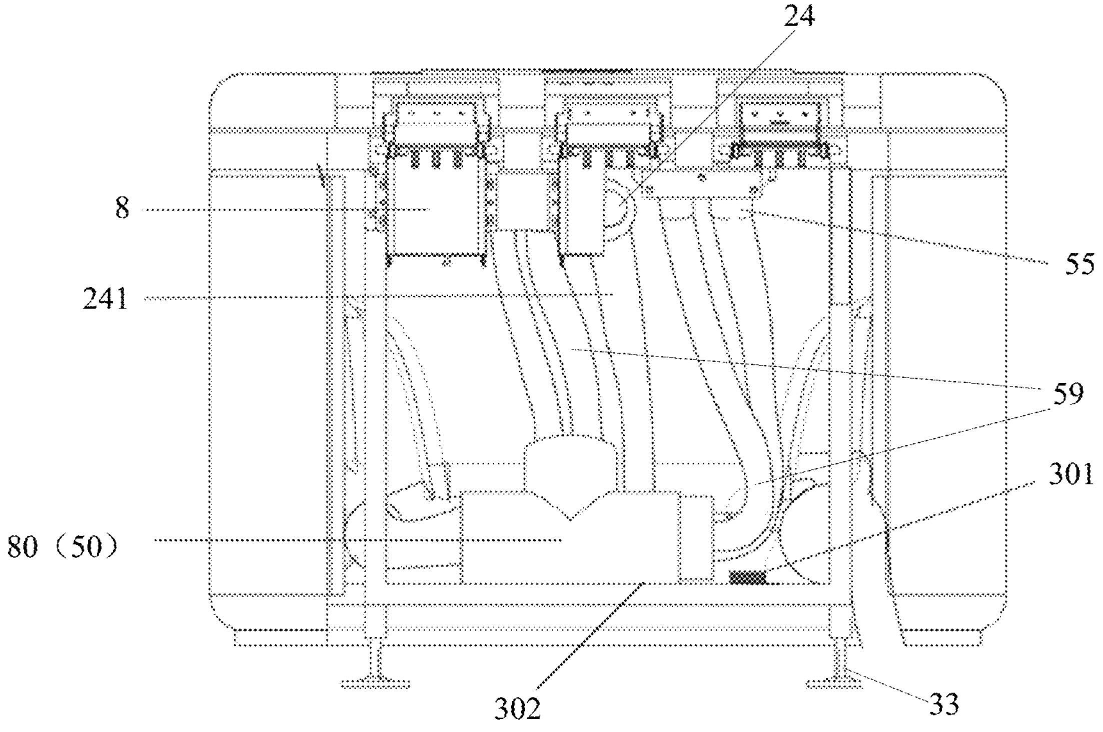
FIG. 8 is a plan view of the bathtub device viewed from a tail side, with a partial structure being shown in a cut-away view.

Referring to FIGS. 4-6, as described above, the bathtub body 2 comprises the head 27 and the tail 28. The bathtub device 1 further comprises a cover plate 7, and when the cover plate 7 covers the bathtub device, the gas may be gathered inside the bathtub body 2 to facilitate effective discharging of the gas. The bathtub body support 3 comprises a hinge device 8 arranged corresponding to an upper side of the tail 28 of the bathtub 2. For example, the hinge device 8 may be arranged on a side edge of the peripheral edge 34 of the bathtub body support 3 corresponding to the tail 28. The bathtub body support 3 further comprises a rail device 9 connected to the hinge device 8. The rail device 9 comprises a rail 91 extending from the tail 28 to the head 27 on the upper side of the bathtub body 2. The cover plate 7 is arranged on the rail device 9 and can be guided by the rail 91 to slide. For example, a slide rail 71 is arranged on the cover plate 7, and the slide rail 71 may be in sliding fit with the rail 91, such that the cover plate 7 is capable of being guided by the rail 91 to slide. When placed horizontally on the bathtub body 2, the cover plate 7 moves along the rail 91 in the length direction D1. The rail device 9 and the cover plate 7 may be supported by the hinge device 8 to rotate. For the example structure of the hinge device 8, reference may be made to FIGS. 7 and 8. FIG. 7 is an enlarged partial schematic diagram of the part M in FIG. 6, and FIG. 8 is a side view of the bathtub body 2 viewed from the tail 28 in the length direction D1. For example, the hinge device 8 may comprise a connecting member 82 connected to the bathtub body support 3 (particularly the side edge of the peripheral edge 34 corresponding to the tail 28), a connecting member 83 connected to the rail device 9, and a pin shaft 81 passing through the connecting member 82 and the connecting member 83. Therefore, the rail device 9 may rotate about the pin shaft 81 relative to the bathtub body support 3 or the bathtub body 2, and the cover plate 7 is slidably arranged on the cover plate 7 relative to the rail device 9.

The cover plate 7 comprises a notch 72 which make it convenient for the user to expose his/her head. Referring to FIG. 4, an auxiliary cover 70 is further arranged at a position on the bathtub body 2 close to the head 27, and the auxiliary cover 70 is provided with a notch 701. The notch 72 of the cover plate 7 is generally V-shaped, and the notch 701 of the auxiliary cover 70 and the notch 72 of the cover plate 7 may be assembled to form a generally triangular opening. Assuming that the user is sitting or lying in the bathtub body 2 with his/her head exposed from the notch 72, the user may push the cover plate 7 toward the tail 28 of the bathtub body 2 as desired. The cover plate 7 slides relative to the rail device 9 to enter the state of FIG. 5. At this point, more space can be provided for the user, and the user may place any item such as a computer or food on the cover plate 7 as desired.

The hinge device 8 with a high resistance may be provided to prevent a situation in which the user first rotates the rail device 9 and the cover plate 7 by means of the hinge device 8 to lift the cover plate 7 and then slides the cover plate 7, thereby avoiding affecting the user experience and preventing potential safety hazards.

Alternatively, a safety pin extending in the width direction D2 of the bathtub body 2 may be arranged on the cover plate 7, and an outer side surface of the bathtub body 2 or the bathtub body support 3 is provided with a sliding groove extending in the length direction D1 of the bathtub body 2. The safety pin on the cover plate 7 may be inserted in the sliding groove on the outer side surface, and the safety pin can be released from the sliding groove after the cover plate 7 slides by a certain distance with the safety pin toward the tail 28. Therefore, when the cover plate 7 is in the position shown in FIG. 4, the safety pin is inserted into the sliding groove of the bathtub body support 3, such that the cover plate 7 can be prevented from rotating and being lifted but the cover plate 7 is allowed to slide in the length direction D1. However, upon the cover plate 7 sliding by a certain distance toward the tail 28, for example, when the cover plate is in the state shown in FIG. 5, the safety pin is separated from the sliding groove on the outer side surface, and rotating and lifting actions can be performed at this time.

The foregoing exhaust system 4 may be also mounted at a position on the cover plate 7 close to the tail 28, and various pipelines of the exhaust system 4 may be arranged in the spaces on two sides of the bathtub body 2.

An overflow pipe 241 connected to the overflow hole 24 is also shown in FIG. 8, and the excess water in the bathtub body 2 can flow out from the overflow pipe 241 through the overflow hole 24.

Figure 9:
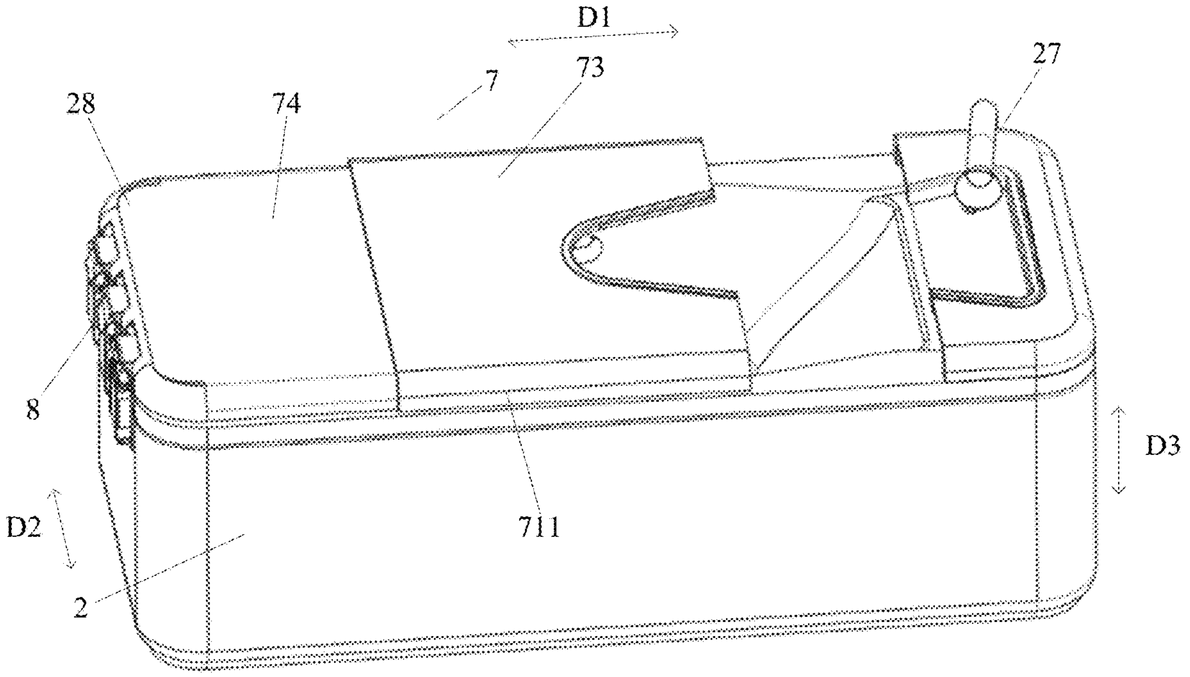
FIG. 9 is a perspective view of another embodiment of the cover plate being opened.
Figure 10:
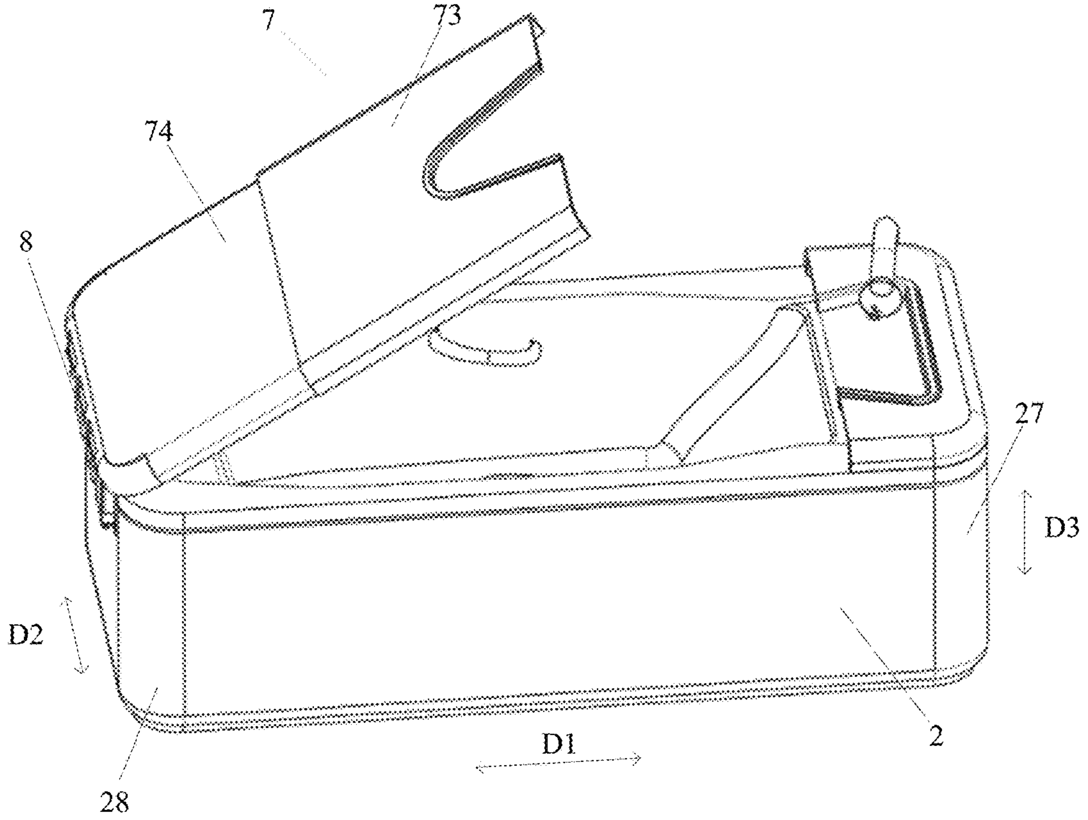
FIG. 10 is another perspective view of another embodiment of the cover plate being opened.

FIGS. 9 and 10 show another embodiment of the configuration of the cover plate 7. In this embodiment, the reference numbers for the elements and some of the contents in the preceding embodiments are used, wherein like reference numbers are used to designate like or similar elements, and the description of the same technical content is selectively omitted. Reference may be made to the preceding embodiment for the description of the omitted part, which will not be described again in this embodiment.

In this embodiment, the cover plate 7 is divided into a front cover plate section 73 and a rear cover plate section 74 in the length direction D1 or in a direction from the head 27 to the tail 28, and the rear cover plate section 74 is connected to the hinge device 8. The front cover plate section 73 is arranged above the rear cover plate section 74 and is capable of sliding relative to the rear cover plate section 74. The cover plate 7 (particularly the rear cover plate section 74) is may be supported by the hinge device 8 to rotate. In use, the cover plate 7 may be lifted simply by pushing the front cover plate section 73 toward the tail 28 relative to the rear cover plate section 74 and then rotating the rear cover plate section 74 together with the front cover plate section 73 by means of the hinge device 8. The front cover plate section 73 slides above the rear cover plate section 74, and two side edges 711 of the front cover plate section 73 in the width direction D2 clamp the rear cover plate section 74. Alternatively, the dimension of the front cover plate section 73 in the width direction D2 is greater than that of the rear cover plate section 74 so as to accommodate the rear cover plate section 74.

Figure 11:
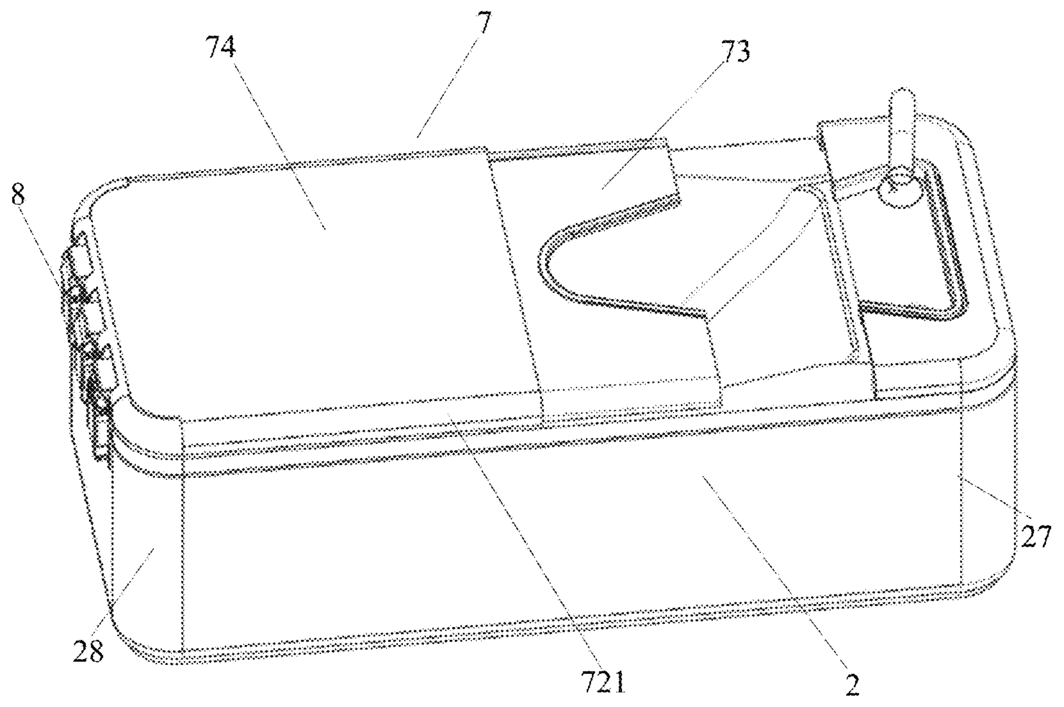
FIG. 11 is a perspective view of a yet another embodiment of the cover plate being opened.
Figure 12:
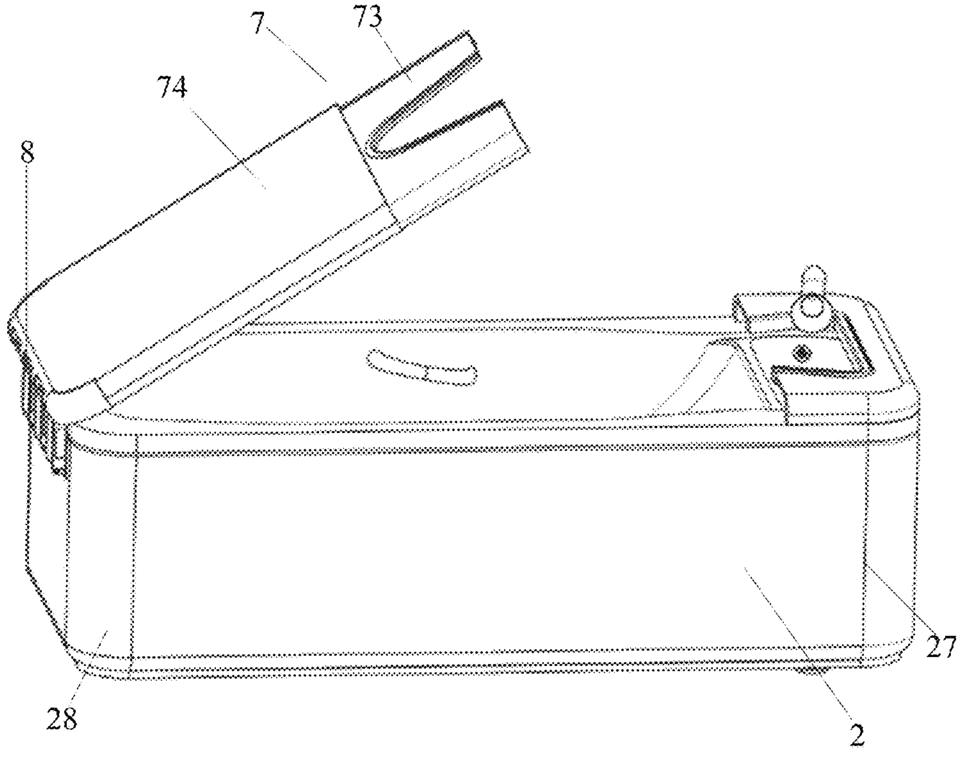
FIG. 12 is another perspective view of a still yet another embodiment of the cover plate being opened.

FIGS. 11 and 12 show a further embodiment of the configuration of the cover plate 7. In this embodiment, the reference numbers for the elements and some of the contents in the preceding embodiments are used, wherein like reference numbers are used to designate like or similar elements, and the description of the same technical content is selectively omitted. Reference may be made to the preceding embodiment for the description of the omitted part, which will not be described again in this embodiment.

In this embodiment, the cover plate 7 comprises a front cover plate section 73 and a rear cover plate section 74 like the preceding embodiment, except that the front cover plate section 73 may slide below the rear cover plate section 74 relative to the rear cover plate section 74, the front cover plate section 73 is clamped by two side edges 721 of the rear cover plate section 74 in the width direction D2, alternatively, the dimension of the front cover plate section 73 in the width direction D2 is less than that of the rear cover plate section 74, so as to accommodate the rear cover plate section 74.

Figure 13:
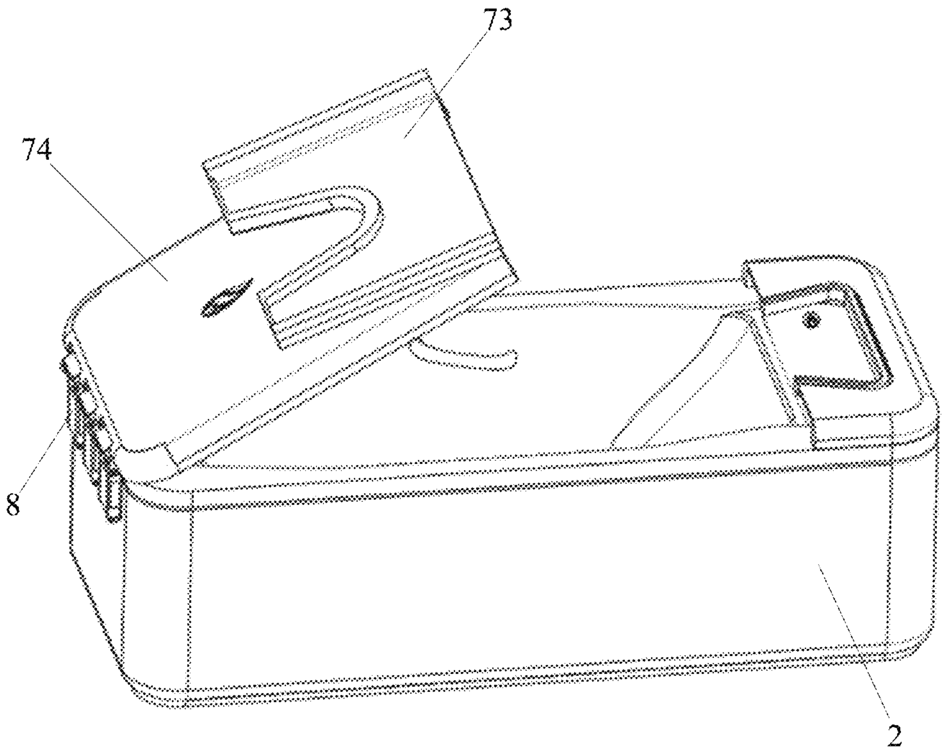
FIG. 13 is a schematic view of other embodiments of the cover plate being opened.

The cover plate 7 may be further configured such that the front cover plate section 73 can be rotated relative to the rear cover plate section 74 and lifted, for example, by means of a hinge. As shown in FIG. 13, the front cover plate section 73 can be lifted separately, and then is lifted together with the rear cover plate section 74 as a whole by means of the hinge device 8.

Figure 14:
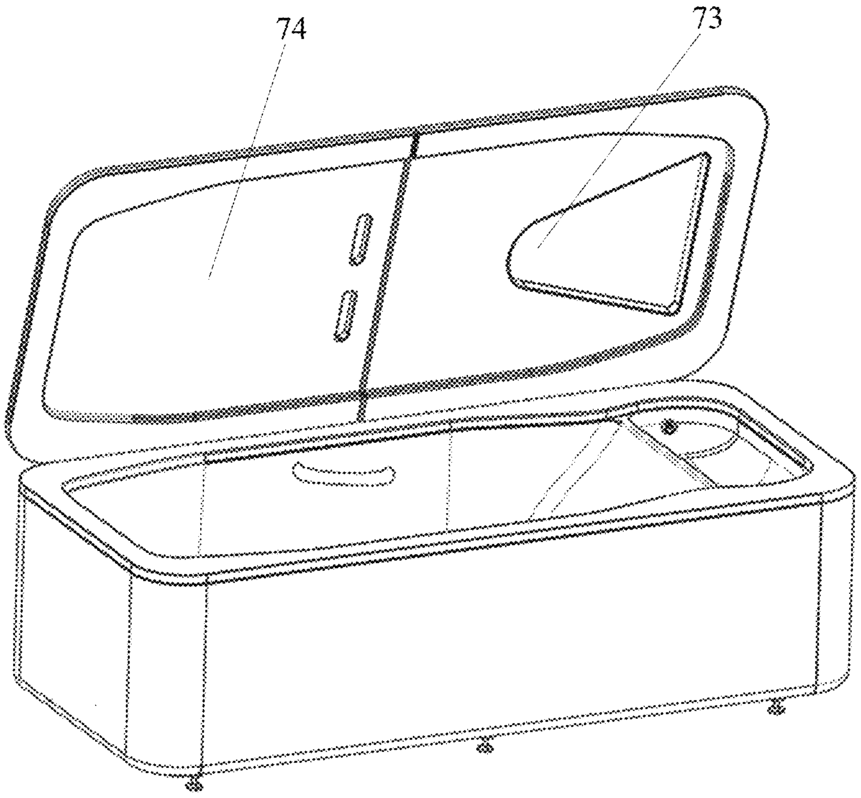
FIG. 14 is another schematic view of other embodiments of the cover plate being opened.

The cover plate 7 may alternatively be arranged such that the front cover plate section 73 and the rear cover plate section 74 can be independently lifted laterally, for example, by means of their respective hinges. As shown in FIG. 14, only the front cover plate section 73 may be selectively opened by the user to carry out air exhaust while the rear cover plate section 74 remains in a semi-closed state.

Referring to FIGS. 1 and 2, FIG. 1 shows that the bathtub device 1 may further comprise a gas concentration alarm 75, and a gas concentration sensor capable of sensing the concentration of a specific gas may be also comprised in the gas concentration alarm 75. The gas concentration alarm 75 may be arranged in the V-shaped notch 72 of the cover plate 7. Normally, the exhaust system 4 of the bathtub device 1 can ensure that no gas escapes from the V-shaped notch 72 of the cover plate 7 or the concentration of the escaped gas is within a safe range of concentration. The provision of the gas concentration alarm 75 allows for reminding the abnormality of excess gas. The bathtub device 1 further comprises a bathtub cleaner 76 which can spray water to clean the inside of the bathtub body 2. A pedal 100 may be further provided in the bathtub body 2 of the bathtub device 1. For example, the pedal 100 may be configured to be movable, such that users of different heights can make an adjustment for a comfortable posture by stepping on the pedal 100 during bubble bath.

FIG. 2 also shows that the bathtub device 1 may further comprise a calling system 77. For example, the calling system 77 may be also arranged in the V-shaped notch 72 of the cover plate 7, making it convenient for the user to call others. The bathtub device 1 further comprises a bathtub water inlet pipe 78 that supplies water to the bathtub body 1. The bathtub device 1 further comprises a gas eliminator 90, and the gas eliminator 90 can decompose the gas discharged from the bathtub body 2 into harmless and safe gases. For example, in FIG. 2, the gas eliminator 90 is arranged between the exhaust inlet end 421 and the exhaust outlet end 422 of the exhaust pipe 42 of the exhaust system 4. In another embodiment, the gas eliminator 90 may alternatively be arranged at any suitable position in a gas flow path of the exhaust system 4. The gas eliminator 90 may comprise, for example, an elimination part and a water vapor separation part. The elimination part may comprise, for example, a gas absorbent such as activated carbon that can absorb harmful gases and a heating device. The elimination part may further contain a catalyst such as copper oxide/manganese oxide to accelerate the decomposition of harmful gases into safe gases under the heating effect of the heating device.

The present invention has been disclosed above in terms of the preferred embodiments which, however, are not intended to limit the present invention, and any person skilled in the art could make possible changes and alterations without departing from the spirit and scope of the present invention. Hence, any alterations, equivalent changes and modifications which are made to the above-mentioned embodiments in accordance with the technical substance of the present invention and without departing from the content of the technical solutions of the present invention, will fall within the scope of protection defined by the claims of the present invention.

The invention claimed is:

1. A bathtub device for bubble bath physiotherapy, comprising a bathtub body and a bathtub body support, wherein the bathtub body has an enclosing side wall, a bottom wall, and an upper open side, and the bathtub body is mounted on the bathtub body support, and further comprising an exhaust system, wherein the exhaust system is mounted in a space between the bathtub body and the bathtub body support and comprises:

a fan configured delivering gas and provided with an air inlet side interface device and an air outlet side interface device;

an air suction pipe comprising at least two air suction inlet ends and an air suction outlet end, wherein the at least two air suction inlet ends are air suction holes in an upper side of the enclosing side wall of the bathtub body, wherein at least one of the air suction inlet ends is in communication with the upper open side at a tail of the bathtub body and at least one other of the air suction inlet ends is in communication with the upper open side at a head of the bathtub body, such that the at least two air suction inlet ends are capable of sucking the gas discharged from the bathtub body, and the air suction outlet end is connected to the air inlet side interface device of the fan; and an exhaust pipe having an exhaust inlet end and an exhaust outlet end, wherein the exhaust inlet end is connected to the air outlet side interface device of the fan, wherein the air suction pipe is provided with a water storage portion adjacent at least one of the air suction inlet ends, the water storage portion is provided with a drainage device that allows the fan to suck the gas from the upper open side of the bathtub body through the air suction pipe and that further allows the water in the water storage portion to be discharged from the water storage portion.

2. The bathtub device for bubble bath physiotherapy of claim 1, wherein the air suction pipe is divided into a tail air suction pipe and a head air suction pipe, and the tail air suction pipe and the head air suction pipe each have an air suction outlet end connected to the air inlet side interface device.

3. The bathtub device for bubble bath physiotherapy of claim 1, wherein the air suction holes comprise an outer hole connecting member and an inner hole connecting member, the bathtub body is provided with a mounting hole corresponding to the inner hole connecting member, the mounting hole is higher than an overflow hole of the bathtub body, the inner hole connecting member and the outer hole connecting member each have flange edges, the inner hole connecting member passes through the mounting hole and is inserted in and connected to the outer hole connecting member located on an outer side of the bathtub body, and the flange edges of the inner hole connecting member and the outer hole connecting member are respectively located on an inner side and an outer side of the enclosing side wall of the bathtub body and clamp the bathtub body, and the air suction pipe comprises a main pipe and a plurality of tubes on one side of at least one of the air suction inlet ends, the outer hole connecting member is provided with tube holes corresponding to the plurality of tubes, and the plurality of tubes connect the main pipe to the air suction holes to form a flow path for delivering the gas.

4. The bathtub device for bubble bath physiotherapy of claim 1, wherein the drainage device is a small opening, and the small opening is sized in such a way that the air suction volume of the fan is not substantially affected;

or the drainage device is a drain valve, the bathtub device further comprises an anti-overflow sensor arranged on the water storage portion and configured to detect liquid downstream of the air suction inlet end, and the drain valve drains water based on an output signal of the anti-overflow sensor.

5. The bathtub device for bubble bath physiotherapy of claim 1, wherein the bathtub body has a length direction and two ends located in the length direction, an auxiliary device adjacent to the upper open side is provided at one of the two ends of the bathtub body, a mounting space is provided below the auxiliary device, and the fan is arranged in the mounting space;

the air suction pipe is divided into a short air suction pipe and a long air suction pipe, and the short air suction pipe is led out from the air inlet side interface device of the fan and extends in the height direction of the bathtub body; and the long air suction pipe is led out from the air inlet side interface device of the fan, extends in the length direction of the bathtub body to the other one of the two ends, and then extends in the height direction of the bathtub body.

6. The bathtub device for bubble bath physiotherapy of claim 1, wherein a flow control valve capable of being manually or electronically controlled is provided in the air suction pipe and is configured to control the diameter of the air suction pipe so as to adjust the air suction volume at the air suction inlet end.

7. The bathtub device for bubble bath physiotherapy of claim 1, further comprising a fan controller and a gas sensor, wherein the gas sensor is arranged corresponding to the upper open side of the bathtub body and is configured to detect the concentration of a specific gas at the upper open side of the bathtub body, and the fan controller controls the rotational speed of the fan based on an output signal of the gas sensor.

8. The bathtub device for bubble bath physiotherapy of claim 1, wherein the bathtub body comprises a head and a tail, the bathtub body support comprises a hinge device arranged corresponding to an upper side of the tail of the bathtub body and further comprises a rail device connected to the hinge device, the rail device comprises a rail extending from the tail to the head on the upper side of the bathtub body, the bathtub device further comprises a cover plate provided with a slide rail, the slide rail is in sliding fit with the rail, such that the cover plate is capable of being guided by the rail to slide, and the rail device and the cover plate are capable of being supported by the hinge device to rotate.

9. The bathtub device for bubble bath physiotherapy of claim 1, wherein the bathtub body comprises a head and a tail, the bathtub body support comprises a hinge device arranged corresponding to an upper side of the tail of the bathtub body, the bathtub device further comprises a cover plate that is divided into a front cover plate section and a rear cover plate section in a direction from the head to the tail, the rear cover plate section is connected to the hinge device, and the front cover plate section is arranged above the rear cover plate section and is capable of sliding relative to the rear cover plate section; and the cover plate is capable of being supported by the hinge device to rotate.

10. A bubble bath physiotherapy system, comprising a gas generator and a bathtub device, the gas generator configured to deliver a physiotherapy gas to the bathtub device, wherein the bathtub device is a bathtub device according to claim 1, and the exhaust air volume of the exhaust system is set to be greater than or equal to the quantity of gas escaping per minute from 1 L of water multiplied by the volume of the bathtub body.

* * * * *